C. O. BULLOT.
Hulling Machine.
No. 49,205.  Patented Aug. 1, 1865.
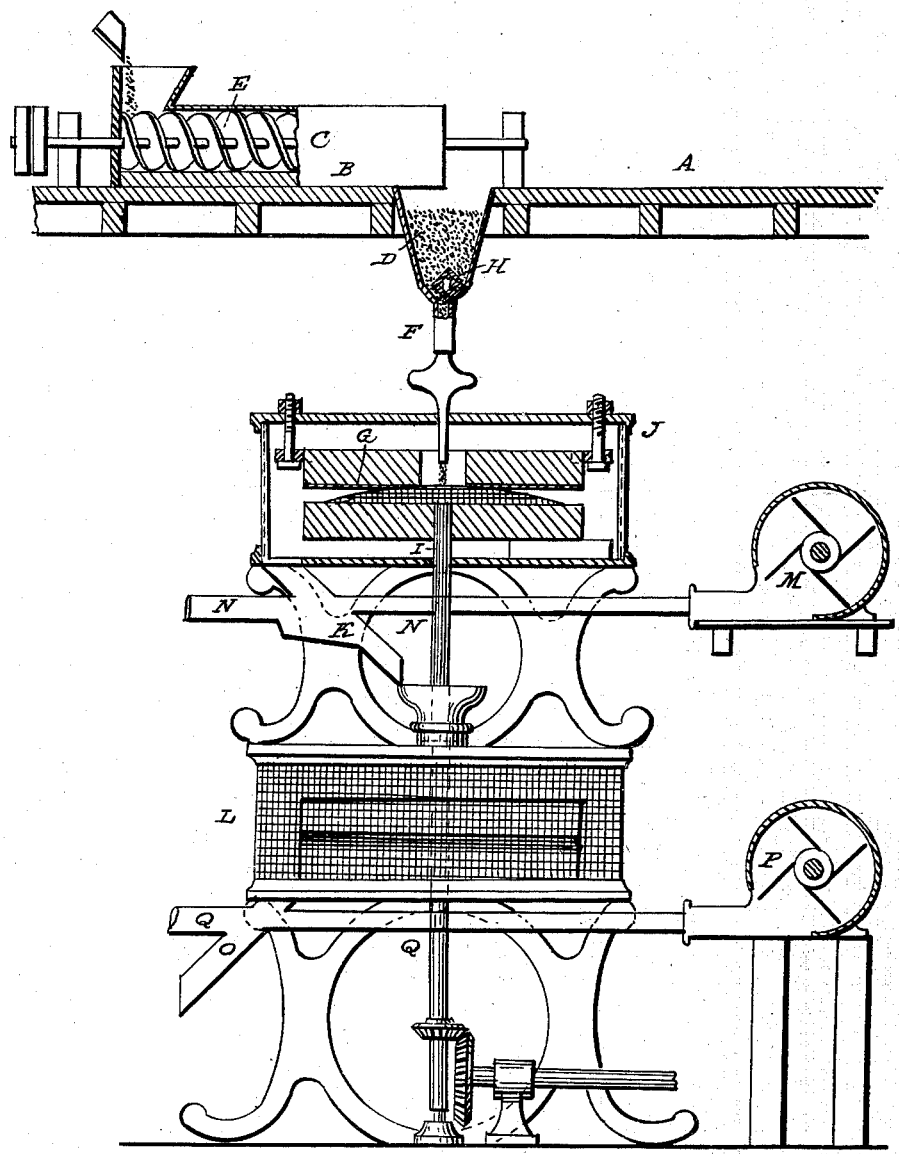

UNITED STATES PATENT OFFICE.

CHRISTOPHE OURS BULLOT, OF SANTA ROSA DE LOS ANDES, CHILI, ASSIGNOR TO BULLOT & COMPANY.

IMPROVEMENT IN MACHINES FOR HULLING GRAIN.

Specification forming part of Letters Patent No. 49,205, dated August 1, 1865.

*To all whom it may concern:*

Be it known that I, CHRISTOPHE OURS BULLOT, of Santa Rosa de los Andes, in the Republic of Chili, have invented a new and Improved Process for Decorticating Corn and other Grain; and I do hereby declare that the following is a full, clear, and exact description of the same, reference being had to the accompanying drawing, forming part of this specification.

Said drawing represents a longitudinal vertical section of this invention.

In the apparatus the subject of this invention the corn or other grain to be decorticated is subjected to the influence of moisture for a few minutes previous to exposing the same to the decorcitating apparatus, which is composed of two pairs of wooden grinding-disks, the grinding-surfaces of the first pair being covered, one with wire-gauze and the other with leather or other flexible material, and those of the second pair being covered with leather or other flexible material only, in combination with suitable conduits and fan-blowers in such a manner that the grain after having been moistened is conducted to the first pair of grinding-disks, by the action of which the peel or cortex is separated from the body of the grain, and while passing from the first pair of grinding-disks to the second pair the separated peel is blown out by the action of the first fan-blower. On passing through between the second pair of grinding-disks the grain is finally divested of the peel still adhering to it, and a blast passing through the discharge-spout leading from said pair of grinding-disks separates all the remaining impurities from the grain.

A represents a portion of a building which is several (at least two) stories high. On the upper floor, B, is situated a trough, C, through which the grain is fed to the hopper D by the action of a revolving feed-screw, E. While passing through the trough C (or before) the grain is exposed to the action of water, and the hopper is so adjusted that it retains the corn or other grain for two or three minutes to allow the moisture to penetrate and soften the cortical portion thereof. From the hopper the grain passes out through a pipe, F, to the first pair of grinding-disks, G, a distributer, H, being provided in the bottom of the hopper to regulate the discharge.

The disks G are made of wood in the form of ordinary millstones, and the lower disk or runner is secured to a vertical shaft, I, whereas the upper disk is secured to the top of the case J. The grinding-surface of the upper disk is covered with leather and that of the lower disk with wire-gauze, and by the combined action of these grinding-surfaces on the grain the peel or cortex is separated from the body of the grain. On being discharged from the disks G the grain passes down through the conduit K to the second pair of grinding-disks, L. While passing through said conduit the grain is exposed to a current of air created by a fan-blower, M, and passed by means of a pipe, N, transversely through the conduit K. By this current of air such portions of peel which have been completely separated from the bodies of the grain are blown out, and the grain, on reaching the second pair of grinding-disks, is already partially divested of its peel.

The grinding-surfaces of the disks L are both covered with leather or other soft and elastic material, and by their action all the peel is separated from the grain. On being discharged from the disks L the grain passes off through the spout O, and while passing through this spout it is exposed to the action of a current of air created by a fan-blower, P, and passed transversely through said spout by means of a pipe, Q. By this current all the peel and light impurities mixed with the grain are separated from the good grain, and the latter, on being discharged from the spout O, is fit for the grinding-mill without any further preparation.

I claim as new and desire to secure by Letters Patent—

The decortication apparatus herein described, the same consisting of the grinding-disks G L, feeding-screw E, fans M and P, and air pipes or conductors N O, arranged to operate in the manner described.

C. O. BULLOT.

Witnesses:
E. SHERMAN GOULD,
DEMOS.